US012776714B2

(12) United States Patent
Zeng et al.

(10) Patent No.: US 12,776,714 B2
(45) Date of Patent: Oct. 27, 2026

(54) MULTI-PHASE TLVR SECONDARY VOLTAGE STRESS REDUCTION

(71) Applicant: Renesas Electronics America Inc., Milpitas, CA (US)

(72) Inventors: Hulong Zeng, San Jose, CA (US); Ali Ghahary, San Jose, CA (US); Haiyu Zhang, Sunnyvale, CA (US)

(73) Assignee: Renesas Electronics America Inc., San Jose, CA (US)

( * ) Notice: Subject to any disclaimer, the term of this patent is extended or adjusted under 35 U.S.C. 154(b) by 134 days.

(21) Appl. No.: 18/966,753

(22) Filed: Dec. 3, 2024

(65) Prior Publication Data

US 2026/0155750 A1 Jun. 4, 2026

(51) Int. Cl.
*H02M 3/335* (2006.01)
*H02M 1/00* (2006.01)

(52) U.S. Cl.
CPC ..... *H02M 3/33569* (2013.01); *H02M 1/0043* (2021.05)

(58) Field of Classification Search
CPC ........................ H02M 3/33569; H02M 1/0043
See application file for complete search history.

(56) References Cited

U.S. PATENT DOCUMENTS

| | | | | |
|---|---|---|---|---|
| 2023/0049859 | A1* | 2/2023 | Capetillo | H02M 1/0009 |
| 2023/0299687 | A1* | 9/2023 | Shao | H02M 3/1586 |
| 2025/0062695 | A1* | 2/2025 | Narula | H02M 1/32 |
| 2025/0062700 | A1* | 2/2025 | Ahmed | H02M 3/1584 |
| 2026/0155749 | A1* | 6/2026 | Wang | H02M 3/335 |

* cited by examiner

*Primary Examiner* — Rafael O Leon De Domenech
(74) *Attorney, Agent, or Firm* — SCULLY, SCOTT, MURPHY & PRESSER, P.C.

(57) ABSTRACT

Systems and methods for implementing multi-phase TLVR secondary voltage stress reduction are generally described. A semiconductor device can include a controller configured to map a plurality of pulse width modulation (PWM) signals in a default order as a first sequence to operate a trans-inductor voltage regulator (TLVR). The TLVR can include a primary circuit and a secondary circuit, and the primary circuit can include a plurality of phases. The semiconductor device can further include a circuit configured to map the plurality of PWM signals to a second sequence different from the first sequence. The controller can be configured to output the plurality of PWM signals in the second sequence to operate the TLVR.

20 Claims, 5 Drawing Sheets

MULTI-PHASE TLVR SECONDARY VOLTAGE STRESS REDUCTION

BACKGROUND

The present disclosure relates in general to semiconductor devices. More specifically, the present disclosure relates to secondary voltage stress reduction in Trans-Inductor Voltage Regulators (TLVR).

A Trans-Inductor Voltage Regulator (TLVR) is a form of switching voltage regulator designed to improve dynamic response in multi-phase power delivery systems. The TLVR structure typically includes a controller, multiple power stages, and coupled inductors known as trans-inductors. Each trans-inductor consists of a primary and secondary winding, with the secondary windings of all phases connected to create a coupling effect. The controller provides control signals to the power stages, which drive the primary windings of the trans-inductors. This configuration allows for simultaneous current change in all phases when the duty cycle of any single phase changes, resulting in faster transient response compared to traditional multi-phase voltage regulators.

SUMMARY

In one embodiment, a semiconductor device that can implement multi-phase TLVR secondary voltage stress reduction is generally described. The semiconductor device can include a controller configured to map a plurality of pulse width modulation (PWM) signals in a default order as a first sequence to operate a trans-inductor voltage regulator (TLVR). The TLVR can include a primary circuit and a secondary circuit and the primary circuit can include a plurality of phases. The semiconductor device can further include a circuit configured to map the plurality of PWM signals to a second sequence different from the first sequence. The controller can be further configured to output the plurality of PWM signals in the second sequence to operate the TLVR.

In one embodiment, a system that can implement multi-phase TLVR secondary voltage stress reduction is generally described. The system can include a trans-inductor voltage regulator (TLVR). The TLVR can include a primary circuit and a secondary circuit and the primary circuit can include a plurality of phases. The system can further include a controller configured to map a plurality of pulse width modulation (PWM) signals in a default order in a first sequence to operate the TLVR. The controller can be further configured to map the plurality of PWM signals to a second sequence different from the first sequence. The controller can be further configured to output the plurality of PWM signals in the second sequence to operate the TLVR.

In one embodiment, a method that can implement multi-phase TLVR secondary voltage stress reduction is generally described. The method can include mapping a plurality of pulse width modulation (PWM) signals in a default order as a first sequence to operate a trans-inductor voltage regulator (TLVR). The TLVR can include a primary circuit and a secondary circuit and the primary circuit can include a plurality of phases. The method can further include mapping the plurality of PWM signals to a second sequence different from the first sequence. The method can also include outputting the plurality of PWM signals in the second sequence to operate the TLVR.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
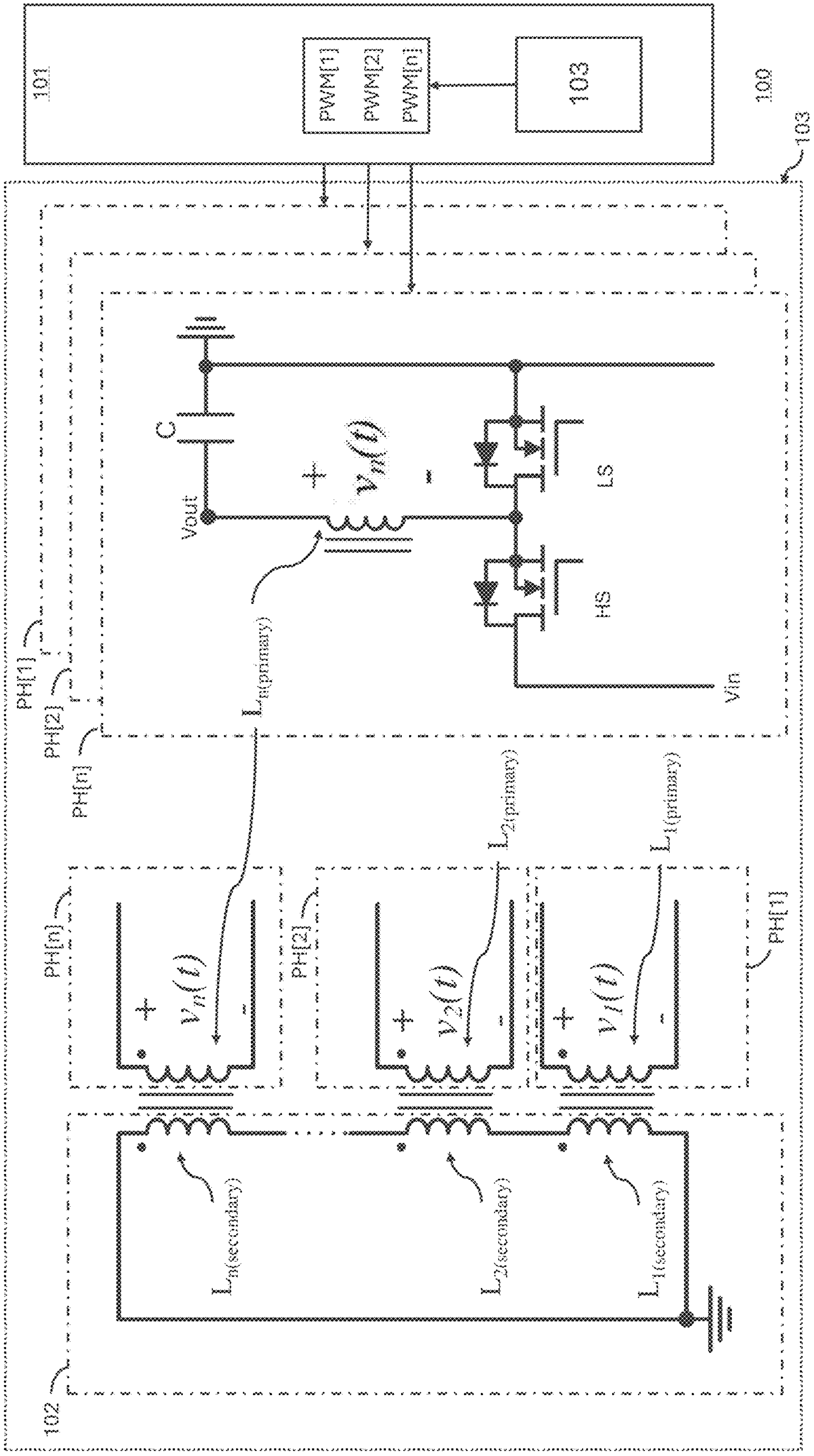
FIG. 1 is a diagram showing a system that can implement multi-phase TLVR secondary voltage stress reduction in one embodiment.

FIG. 1 is a diagram showing a system that can implement multi-phase TLVR secondary voltage stress reduction in one embodiment. A system 100 shown in FIG. 1 can be implemented by a multi-phase TLVR. System 100 can include at least a controller 101, at least one TLVR group 103 comprising of a plurality of phases PH and a secondary side circuit 102. In the example shown in FIG. 1, system 100 can include at least two phases labeled as PH[1], PH[2], . . . PH[n].

The plurality of phases PH can be configured as a primary circuit. Each phase PH can comprise of two switches high-side (HS) and low-side (LS), a capacitor C, and an inductor $L_{(primary)}$. HS and LS switches can be field-effect transistors (FETs) such as metal oxide semiconductor field effect transistors (MOSFETs). In other embodiments, HS and LS switches can be diodes or insulated-gate bipolar transistors (IGBTs). A capacitor C can be connected to both the switches HS, LS and inductor $L_{(primary)}$. Inductor $L_{(primary)}$ is magnetically coupled to a corresponding inductor $L_{(secondary)}$, which is part of secondary side circuit 102. The interaction between the primary circuit, i.e. phases PH, and the secondary side circuit 102 forms a coupled inductor system, where energy transfer occurs through the magnetic coupling of $L_{(primary)}$ and $L_{(secondary)}$.

Secondary side circuit 102 can comprise of a plurality of inductors $L_{1(secondary)}$, $L_{2(secondary)}$, . . . $L_{n(secondary)}$(hereinafter "$L_{secondary}$"). For each phase PH, comprised in system 100, is a corresponding inductor $L_{secondary}$. Each inductor $L_{secondary}$ in the plurality of inductors $L_{secondary}$ is magnetically coupled to a corresponding inductor $L_{primary}$ of one of the phases PH. For example, as shown in FIG. 1, inductor $L_{1(primary)}$ of phase PH[1] is magnetically coupled to $L_{1(secondary)}$, inductor $L_{2(primary)}$ of phase PH[2] is magnetically coupled to $L_{2(secondary)}$, . . . inductor $L_{n(primary)}$ of phase PH[n] is magnetically coupled to $L_{n(secondary)}$.

Controller 101 can include, for example, a processor, microcontroller, central processing unit (CPU), field-programmable gate array (FPGA) or any other circuitry that is configured to control and operate system 100. While described as a CPU in illustrative embodiments, controller 101 is not limited to a CPU in these embodiments and may comprise any other circuitry that is configured to control and operate TLVR system 100. Controller 101 can be configured to generate control signals, such as pulse width modulation (PWM) signals PWM[1], PWM[2], . . . PWM[n]. Controller 101 can generate the PWM signals for each phases PH to selectively turn switches HS, LS in phases of system 100 on and off. To be described in more detail below, controller 101 can comprises of a circuit 103. Circuit 103 can be an integrated circuit (IC) or logic circuit configured to rearrange PWM signals to reduce secondary voltage stress. Controller 101 can also comprise of registers or memory circuits configured to store information such as the number of configured phases or rules regarding the firing or output order of the PWM signals.

In TLVR systems, the number of phases can be high, e.g., 16 or 32 phases. Therefore, the secondary circuit would comprise of a high number of secondary inductors to be coupled to the inductor of each phase. In an example system, the number of phases can be greater than the number of PWM signals being generated by the controller 101. For example, in a system 100 comprising of 32 phases, a group of 16 phases can form one TLVR group 103 and another group of 16 phases can form another TLVR group. Therefore, this example system 100 comprises of two TLVR groups 103 each with 16 phases. The 16 PWM signals generated by the controller 101 can each drive two phases—one phase in both TLVR groups 103. In another example system comprising of one TLVR group 103, the number of phases (e.g., 16_phases) can be equal to the number of PWM signals being generated (e.g., 16 PWM signals). Thus, the 16 PWM signals can drive one phase each. However, with such a high number of phases, conventional TLVR systems face a challenge related to voltage stress on the secondary side.

When a TLVR system is in operation, especially during rapid load changes, a significant voltage can develop across the primary windings of all phases. This voltage is then reflected onto the secondary windings of the TLVR system. The voltage stress can reach its highest when half of the phases are in the ON state and the other half are in the OFF state. In this scenario, when certain phases are in the ON state, they attempt to increase current flow through the secondary side circuit. The inactive (OFF) phases affect the magnetic fields within the coupled inductors. Due to the magnetic coupling between the primary and secondary inductors, the current changes in the ON phases induce opposing voltages in the OFF phases. This interaction creates a significant voltage differential across the secondary windings, potentially leading to high voltage stress on the inductors on the secondary side, especially during rapid switching events. When a phase's high-side FET is ON, the voltage across that phase is approximately the difference between the input voltage and the output voltage, while for phases in the OFF state, it's approximately the output voltage subtracted from 0.

As the number of phases in system 100 increases, the potential for voltage imbalance between ON and OFF phases grows. In a system with N total phases, where m phases are ON, the maximum voltage (vmax) point occurs at the m-th phase and can be determined based on the relationship $vmax(t)=(m-m^2/N)\cdot Vin$, wherein Vin is the input voltage. This relationship shows that in systems with high number of phases, the voltage stress on individual secondary inductors can approach levels close to the input voltage of the entire system 100.

A conventional approach to manage voltage stress is to use a dedicated compensation inductor (Lc) that can increase system size and complexity. In an aspect, some conventional systems attempt to address the shortcomings of the compensation inductor by leveraging the inherent leakage inductance (also known as parasitic inductance) of the coupled inductors on the secondary side circuit as an evenly distributed compensation inductance. This approach eliminates the need for a separate compensation inductor, potentially reducing system size and complexity. However, the distributed compensation inductance approach fails to reduce voltage stress when at least half of the phases on the primary side are turned ON.

To further optimize voltage stress reduction, controller 101 of TLVR system 100 can be configured to rearrange the firing sequence of PWM signals such that the PWM signals can be outputted in a new firing sequence that is different from a default (or natural order) sequence. In one embodiment, circuit 103 in controller 101 can be configured to map the PWM signals to the new firing sequence that is different from the default firing sequence, and controller 101 can output the PWM signals according to the new firing sequence. The new firing sequence can be optimized sequence that can help distribute the voltage stress more evenly across the secondary inductors in secondary side circuit 102, reduce the maximum voltage point and balance the leakage voltage distribution.

Figure 2:
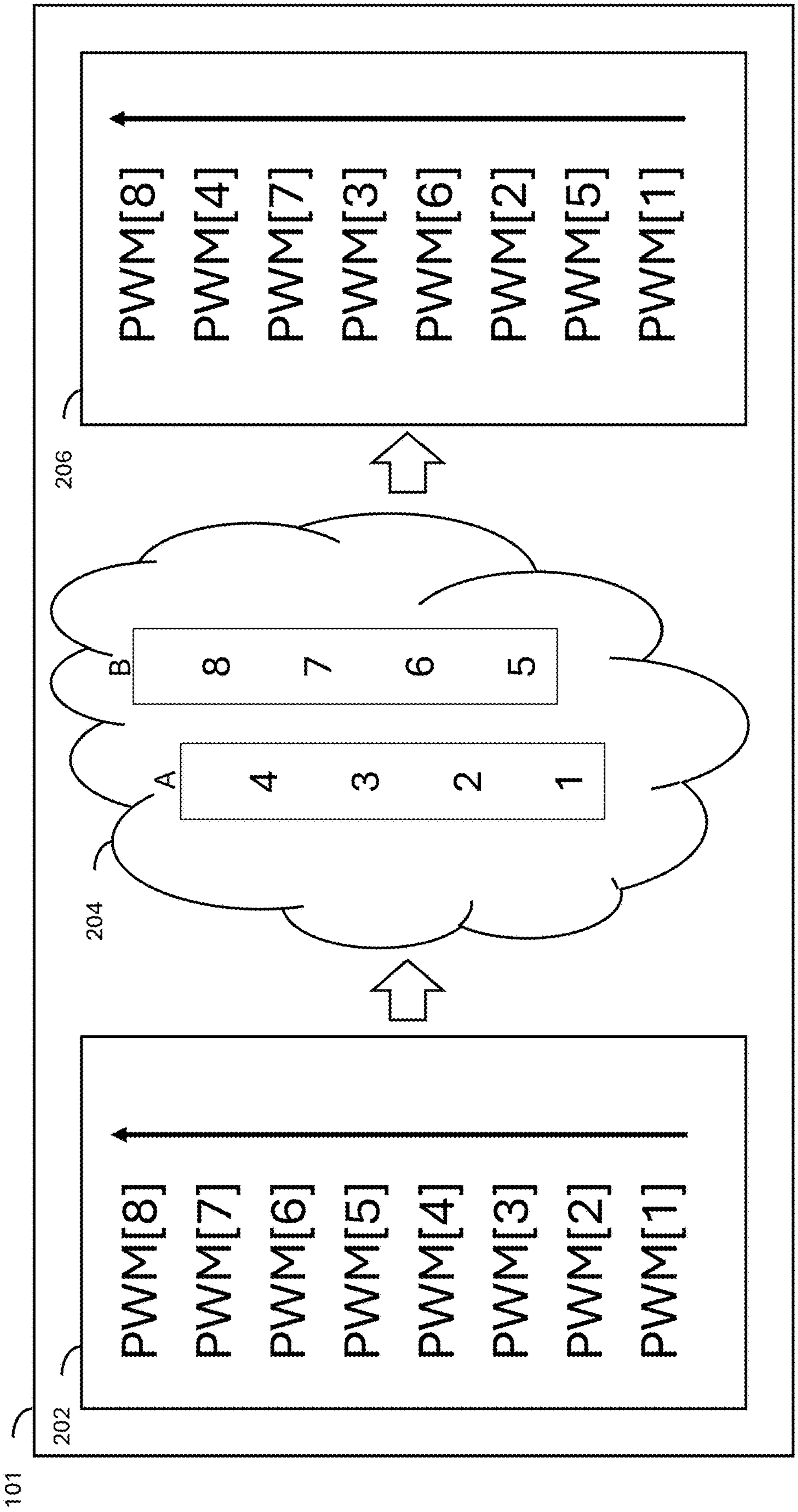
FIG. 2 is a diagram showing an example implementation of multi-phase TLVR secondary voltage stress reduction in one embodiment.

FIG. 2 is a diagram showing an example implementation of multi-phase TLVR secondary voltage stress reduction in one embodiment. Descriptions of FIG. 2 may reference components shown in FIG. 1. In the example embodiment shown in FIG. 2, the circuit 103 of controller 101 is configured to rearrange the firing sequence of the PWM signals generated for a TLVR system 100 comprising of eight phases. Therefore, controller 101 is configured to fire a PWM[1] signal for phase PH[1], PWM[2] signal for phase PH[2] . . . and PWM[8] signal for phase PH[8]. Block 202 depicts the original firing sequence of the eight PWM signals, where the controller 101 would be configured to fire the PWM signals in an natural order or a default order that may be based on a sequential order according to physical layout and locations of the phases PH and secondary inductors. For example, controller would be configured to fire the first PWM[1] signal, then the second PWM[2] signal, and so on . . . .

To reduce the high voltage stress in the secondary side circuit 102, circuit 103 of controller 101 can rearrange the PWM signals as shown in block 204. Circuit 103 is configured to split the total number of phases N into M groups, wherein M is a factor of N. For example, as shown in block 204, a total phases N of eight can be split into two groups. The phases being assigned to each group can be selected based on predefined criteria saved in a register in the controller 101, e.g., user defined selection. Circuit 103 can be configured to read a value from the register in the controller 101, where the value being read can encode assignment of one or more phases to each group. After dividing the original 8 PWM signals into two subgroups A, B, the elements of each subgroup can represent the PWM signals, and are sequentially interleaved by selecting one element from each subgroup in a cyclic, or alternating manner. The interleave sequence can also be saved in one or more registers in controller 101 and circuit 103 can read values encoding the interleave sequence from the one or more registers to determine the interleave sequence. In one embodiment, an element is taken from the first position of the first subgroup, followed by the first position of the second subgroup, continuing sequentially until all subgroups have been combined for the first position of each subgroup. The process then repeats for the subsequent positions of each subgroup, continuing until all elements from all subgroups have been interleaved and mapped into a single composite sequence. After two subgroups are combined, as seen in block 206, controller 101 can fire the PWM signals in the rearranged order of 1, 5, 2, 6, 3, 7, 4 then lastly 8.

Figure 3:
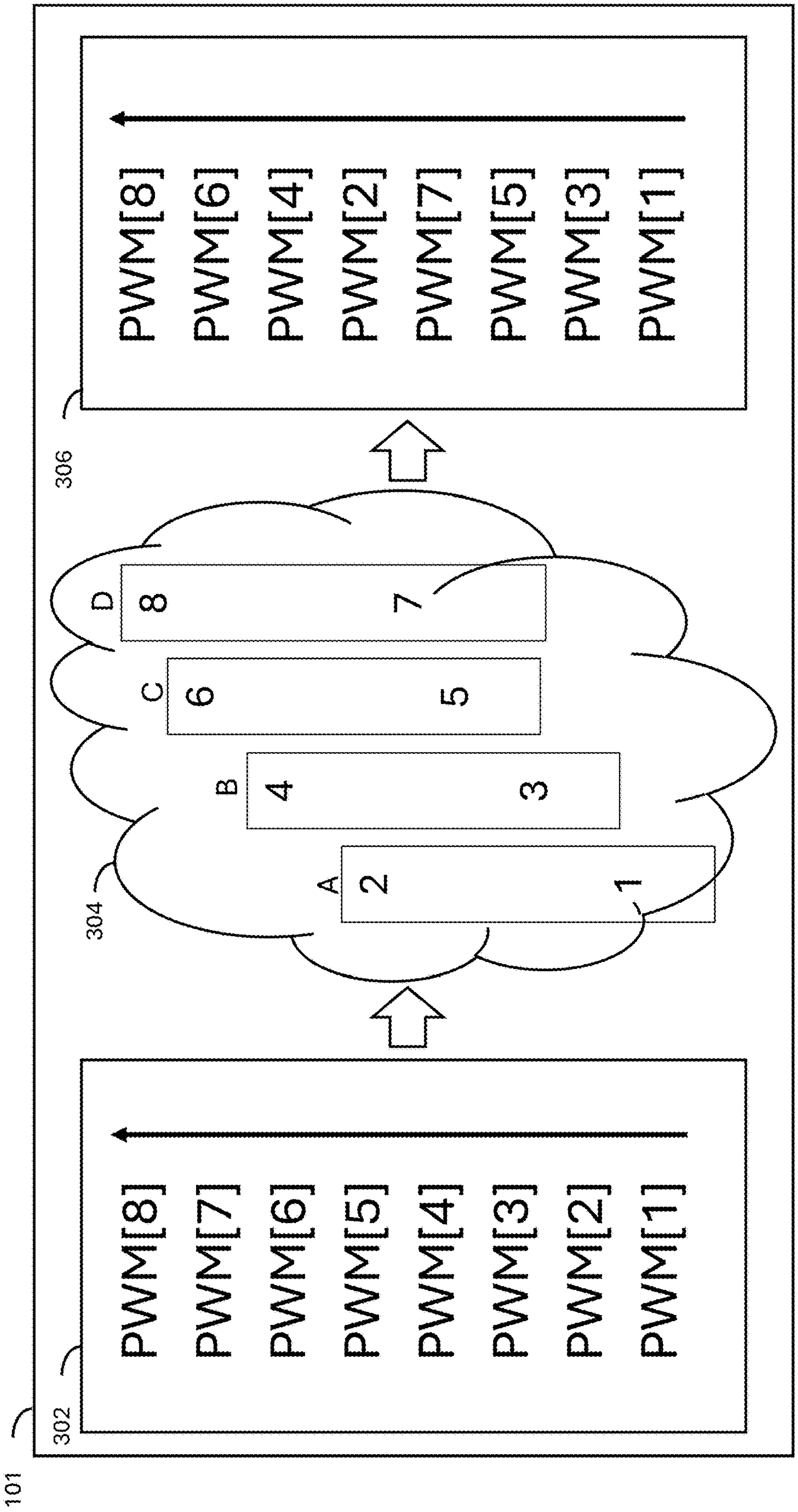
FIG. 3 is a diagram showing an example implementation of multi-phase TLVR secondary voltage stress reduction in one embodiment.

FIG. 3 is a diagram showing an example implementation of multi-phase TLVR secondary voltage stress reduction in one embodiment. Descriptions of FIG. 3 may reference components shown in FIG. 1-2. In the example embodiment shown in FIG. 3, the controller 101 is configured to rearrange the firing sequence of the PWM signals generated for a TLVR system 100 comprising of eight phases. Therefore, controller 101 is configured to fire a PWM[1] signal for phase PH[1], PWM[2] signal for phase PH[2] . . . and PWM[8] signal for phase PH[8]. Block 302 depicts the original firing sequence of the eight PWM signals, where the controller 101 would be configured to fire the PWM signals in an original order that may be based on a sequential order according to physical layout and locations of the phases PH and secondary inductors. For example, controller would be configured to fire the first PWM[1] signal, then the second PWM[2] signal, and so on . . . .

To reduce the high voltage stress in the secondary side circuit 102, circuit 103 of controller 101 can rearrange the PWM signals as shown in block 304. Circuit 103 of controller 101 is configured to split the total number of phases N into M groups, wherein M is a factor of N. For example, as shown in block 304, a total phases N of eight can be split into four groups. The phases being assigned to each group can be selected based on predefined criteria saved in a register in the controller 101, e.g., user defined selection. Circuit 103 can be configured to read a value from the register in the controller 101, where the value being read can be an encoded assignment of one or more phases to each group. After dividing the original 8 PWM signals into four subgroups A, B, C, and D, the elements of each subgroup are sequentially interleaved by selecting one element from each subgroup in a cyclic manner. The interleave sequence can also be saved in one or more registers in controller 101 and circuit 103 can read values encoding the interleave sequence form the one or more registers to determine the interleave sequence. In one embodiment, an element is taken from the first position of the first subgroup, followed by the first position of the second subgroup, then the first position of the third subgroup, and finally the first position of the fourth subgroup, continuing sequentially until all subgroups have been combined in the first position. The process then repeats for the subsequent positions of each subgroup, continuing until all elements from all subgroups have been interleaved and mapped into a single composite sequence. After four subgroups are combined, controller 101 can fire the PWM signals in the rearranged order of 1, 3, 5, 7, 2, 4, 6, then lastly 8.

Figure 4:
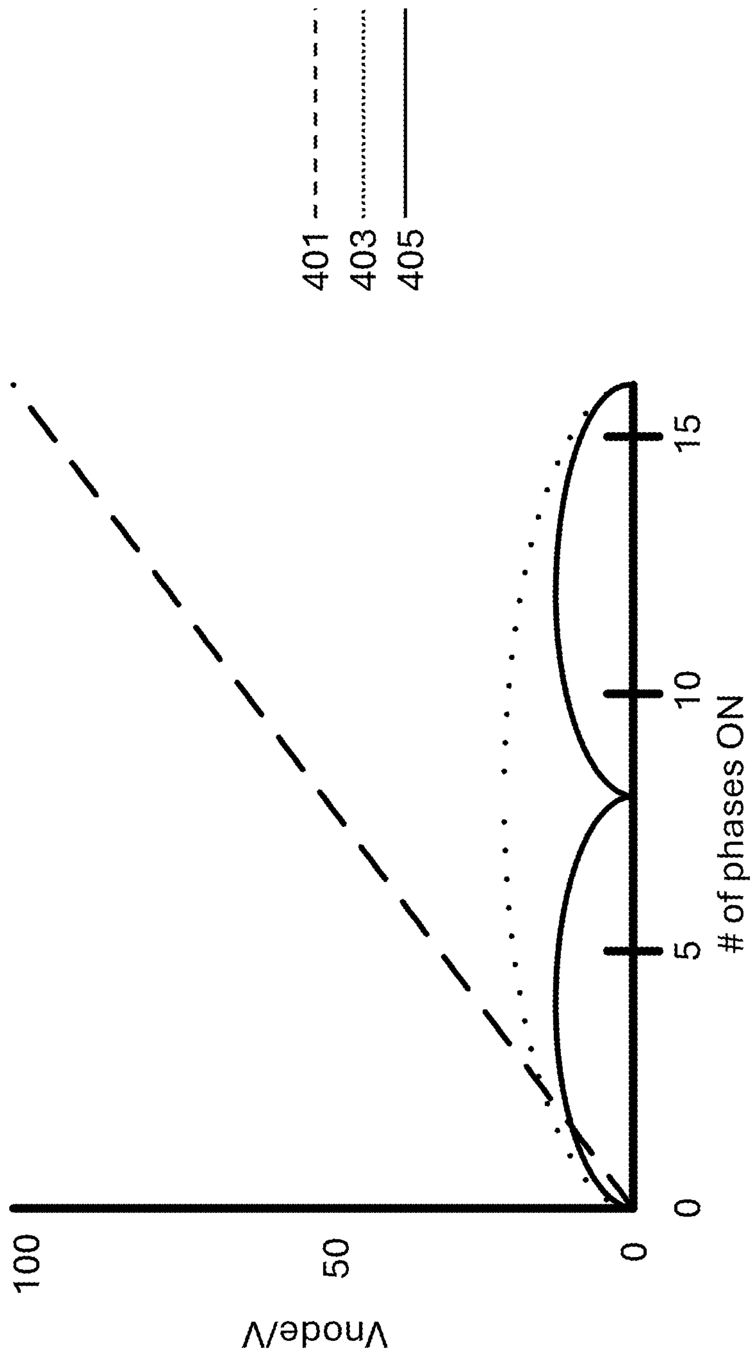
FIG. 4 is a diagram showing an example implementation of multi-phase TLVR secondary voltage stress reduction in one embodiment.

FIG. 4 is a diagram showing an example implementation of multi-phase TLVR secondary voltage stress reduction in one embodiment. Descriptions of FIG. 4 may reference components shown in FIG. 1-3. In the example embodiment shown in FIG. 4, the relationship between the number of phases that are in the ON state and the normalized voltage ratio, in a TLVR system, such as system 100 comprising of 16 phases. The normalized voltage ratio can be represented by Vnode/V wherein the Vnode is a voltage at a connection node between all the phases in the system 100 and V is a reference voltage that can be supplied to the system 100.

Curve 401 represents the relationship between the number of phases ON and the normalized voltage ratio for a conventional TLVR system configured to use only a compensation inductor to control the circulating current on the secondary side. As shown in the example diagram, as the number of phases in the ON state increases, the normalized voltage ratio increases linearly. Therefore, the maximum voltage point would be when every phase is in the ON state. In addition, when half of the phases are ON, the maximum voltage ratio is still around 50. Curve 403 represents the relationship between the number of phases ON and the normalized voltage ratio for a conventional TLVR system configured to fire PWM signals in an original sequential order, i.e., {1, 2, 3, 4, . . . 16}, similar to block 202 in FIG. 2. Curve 403 illustrates the maximum voltage point occurs when exactly half of the phases are ON, e.g., 8 phases.

Curve 405 represents the relationship between the number of phases ON and the normalized voltage ratio for a TLVR system, such as system 100, configured to rearrange the PWM firing sequence to reduce voltage stress. In this example system 100, the controller 101 is configured to rearrange the firing sequence into groups (see block 204 in FIG. 2). After the firing sequence is rearranged, the maximum voltage point is lower than both conventional systems illustrated by curves 401 and 403.

Figure 5:
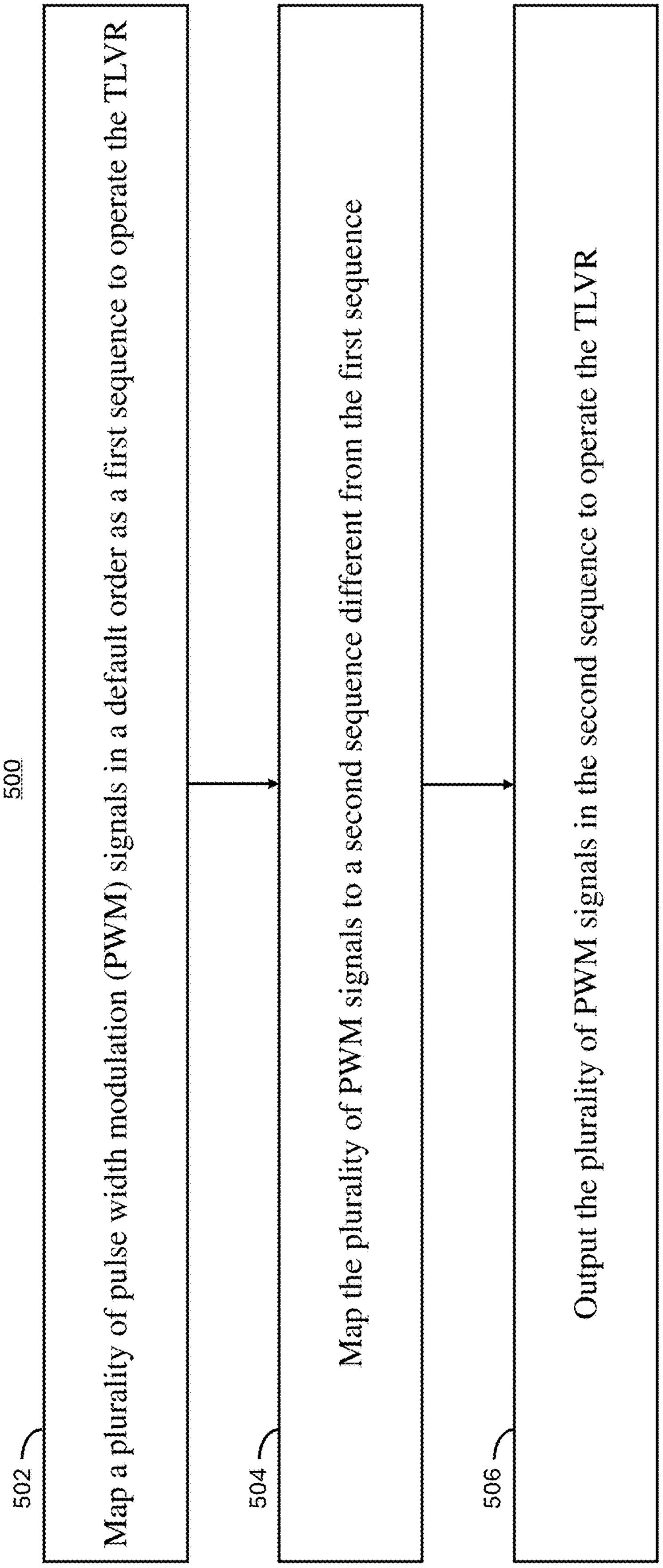
FIG. 5 is a flow chart illustrating a process to implement multi-phase TLVR secondary voltage stress reduction in one embodiment.

FIG. 5 is a flow chart illustrating a process to implement multi-phase TLVR secondary voltage stress reduction in one embodiment. A process 500 can include one or more operations, actions, or functions as illustrated by one or more of blocks 502, 504, and/or 506. Although illustrated as discrete blocks, various blocks can be divided into additional blocks, combined into fewer blocks, eliminated, performed in different order, or performed in parallel, depending on the desired implementation.

Process 500 can be performed by a trans-inductor voltage regulator (TLVR), such as the TLVR being implemented by system 100 described herein. Process 500 can begin at block 502, where a controller of a TLVR can map a plurality of pulse width modulation (PWM) signals in a default order in a first sequence to operate the TLVR. The TLVR can include a primary circuit and a secondary circuit and the primary circuit can include a plurality of phases. The process 500 can continue from block 502 to block 504. At block 504, the controller can map the plurality of PWM signals to a second sequence different from the first sequence. The process 500 can continue from block 504 to block 506. At block 506, the controller can output the plurality of PWM signals in the second sequence to operate the TLVR.

In another embodiment, the TLVR can be one TLVR group among more than one TLVR groups and a number of phases in the plurality of phases in the TLVR group can be equal to a number of PWM signals in the plurality of PWM signals. In another embodiment, the TLVR can further split the plurality of PWM signals into a plurality of groups, and can interleave the plurality of PWM signals from the plurality of groups. In another embodiment, the plurality of PWM signals can comprise N PWM signals, and the plurality of groups can comprise M groups. M can be a factor of N. In another embodiment, M can be greater than one and less than N. In another embodiment, the first sequence can be a sequential sequence order based on physical locations of the plurality of phases.

EXAMPLES

Example 1: A semiconductor device comprising: a controller configured to map a plurality of pulse width modulation (PWM) signals in a default order as a first sequence to operate a trans-inductor voltage regulator (TLVR), wherein the TLVR includes a primary circuit and a secondary circuit and the primary circuit includes a plurality of phases; a circuit configured to map the plurality of PWM signals to a second sequence different from the first sequence; and the controller being further configured to output the plurality of PWM signals in the second sequence to operate the TLVR.

Example 2: The semiconductor device of any one of examples 1, wherein the TLVR is one TLVR group among more than one TLVR groups and a number of phases in the plurality of phases in the TLVR group is equal to a number of PWM signals in the plurality of PWM signals.

Example 3: The semiconductor device of any one of examples 1-2, wherein mapping the plurality of PWM signals to the second sequence comprises: splitting the plurality of PWM signals into a plurality of groups; and interleaving the plurality of PWM signals from the plurality of groups.

Example 4: The semiconductor device of any one of examples 1-3, wherein interleaving the plurality of PWM signals from the plurality of groups comprises selecting an element from each group among the plurality of groups cyclically.

Example 5: The semiconductor device of any one of examples 1-3, wherein: the plurality of PWM signals comprises N PWM signals; the plurality of groups comprises M groups; and M is a factor of N. The semiconductor device is further configured to interleave the plurality of PWM signals from the plurality of groups by selecting an element from each group among the plurality of groups cyclically.

Example 6: The semiconductor device of any one of examples 1-5, wherein M is greater than one and less than N, where the plurality of PWM signals comprises N PWM signals and the plurality of groups comprises M groups.

Example 7: The semiconductor device of any one of examples 1 to 6, wherein the first sequence is a sequential order based on physical locations of the plurality of phases. The semiconductor device is further configured to map the plurality of PWM signals to a second sequence different from the first sequence and output the plurality of PWM signals in the second sequence to operate the TLVR.

Example 8: A system comprising: a trans-inductor voltage regulator (TLVR), wherein the TLVR includes a primary circuit and a secondary circuit and the primary circuit includes a plurality of phases; a controller configured to map a plurality of pulse width modulation (PWM) signals in a default order as a first sequence to operate the TLVR; map the plurality of PWM signals to a second sequence different from the first sequence; and output the plurality of PWM signals in the second sequence to operate the TLVR.

Example 9: The system of any one of examples 8, wherein the TLVR is one TLVR group among more than one TLVR groups and a number of phases in the plurality of phases in the TLVR group is equal to a number of PWM signals in the plurality of PWM signals.

Example 10: The system of any one of examples 8-9, wherein the controller is further configured to split the plurality of PWM signals into a plurality of groups and interleave the plurality of PWM signals from the plurality of groups.

Example 11: The system of any one of examples 8-10, wherein interleaving the plurality of PWM signals from the plurality of groups comprises selecting an element from each group among the plurality of groups cyclically.

Example 12: The system of any one of examples 8-10, wherein the plurality of PWM signals comprises N PWM signals; the plurality of groups comprises M groups; and M is a factor of N.

Example 13: The system of any one of examples 12, wherein M is greater than one and less than N, where the plurality of PWM signals comprises N PWM signals and the plurality of groups comprises M groups.

Example 14: The system of any one of examples 8 to 13, wherein the first sequence is a sequential order based on physical locations of the plurality of phases. The system is further configured to map the plurality of PWM signals to a second sequence different from the first sequence and output the plurality of PWM signals in the second sequence to operate the TLVR.

Example 15: A method comprising: mapping a plurality of pulse width modulation (PWM) signals in a default order as a first sequence to operate a trans-inductor voltage regulator (TLVR), wherein the TLVR includes a primary circuit and a secondary circuit and the primary circuit includes a plurality of phases; mapping the plurality of PWM signals to a second sequence different from the first sequence; and outputting the plurality of PWM signals in the second sequence to operate the TLVR.

Example 16: The method of any one of examples 15, wherein the TLVR is one TLVR group among more than one TLVR groups and a number of phases in the plurality of phases in the TLVR group is equal to a number of PWM signals in the plurality of PWM signals.

Example 17: The method of any one of examples 15-16, further comprising splitting the plurality of PWM signals into a plurality of groups and interleaving the plurality of PWM signals from the plurality of groups.

Example 18: The method of any one of examples 15-17, wherein the plurality of PWM signals comprises N PWM signals; the plurality of groups comprises M groups; and M is a factor of N.

Example 19: The method of any one of examples 15-18, wherein M is greater than one and less than N, where the plurality of PWM signals comprises N PWM signals and the plurality of groups comprises M groups.

Example 20: The method of any one of examples 15-19, wherein the first sequence is a sequential order based on physical locations of the plurality of phases. The method further comprises mapping the plurality of PWM signals to a second sequence different from the first sequence and outputting the plurality of PWM signals in the second sequence to operate the TLVR.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:

a controller configured to map a plurality of pulse width modulation (PWM) signals in a default order as a first sequence to operate a trans-inductor voltage regulator (TLVR), wherein the TLVR includes a primary circuit and a secondary circuit and the primary circuit includes a plurality of phases; and a circuit configured to map the plurality of PWM signals to a second sequence different from the first sequence, wherein the controller is further configured to output the plurality of PWM signals in the second sequence to operate the TLVR.

2. The semiconductor device of claim 1, wherein:

the TLVR is one TLVR group among more than one TLVR groups; and a number of phases in the plurality of phases in the TLVR group is equal to a number of PWM signals in the plurality of PWM signals.

3. The semiconductor device of claim 1, wherein mapping the plurality of PWM signals to the second sequence comprises:

splitting the plurality of PWM signals into a plurality of groups; and interleaving the plurality of PWM signals from the plurality of groups.

4. The semiconductor device of claim 3, wherein interleaving the plurality PWM signals from the plurality of groups comprises selecting an element from each group among the plurality of groups cyclically.

5. The semiconductor device of claim 3, wherein:

the plurality of PWM signals comprises N PWM signals;

the plurality of groups comprises M groups; and

M is a factor of N.

6. The semiconductor device of claim 4, wherein M is greater than one and less than N.

7. The semiconductor device of claim 1, wherein the first sequence is a sequential order based on physical locations of the plurality of phases.

8. A system comprising:

a trans-inductor voltage regulator (TLVR), wherein the TLVR includes a primary circuit and a secondary circuit and the primary circuit includes a plurality of phases; and a controller configured to:

map a plurality of pulse width modulation (PWM) signals in a default order as a first sequence to operate the TLVR, map the plurality of PWM signals to a second sequence different from the first sequence; and output the plurality of PWM signals in the second sequence to operate the TLVR.

9. The system of claim 8, wherein:

the TLVR is one TLVR group among more than one TLVR groups; and a number of phases in the plurality of phases in the TLVR group is equal to a number of PWM signals in the plurality of PWM signals.

10. The system of claim 8, wherein the controller is further configured to:

split the plurality of PWM signals into a plurality of groups; and interleave the plurality of PWM signals from the plurality of groups.

11. The system of claim 10, wherein interleaving the plurality of PWM signals from the plurality of groups comprises selecting an element from each group among the plurality of groups cyclically.

12. The system of claim 10, wherein:

the plurality of PWM signals comprises N PWM signals;

the plurality of groups comprises M groups; and

M is a factor of N.

13. The system of claim 12, wherein M is greater than one and less than N.

14. The system of claim 8, wherein the first sequence is a sequential order based on physical locations of the plurality of phases.

15. A method comprising:

mapping a plurality of pulse width modulation (PWM) signals in a default order as a first sequence to operate a trans-inductor voltage regulator (TLVR), wherein the TLVR includes a primary circuit and a secondary circuit and the primary circuit includes a plurality of phases;

mapping the plurality of PWM signals to a second sequence different from the first sequence; and outputting the plurality of PWM signals in the second sequence to operate the TLVR.

16. The method of claim 15, wherein:

the TLVR is one TLVR group among more than one TLVR groups; and a number of phases in the plurality of phases in the TLVR group is equal to a number of PWM signals in the plurality of PWM signals.

17. The method of claim 15, further comprising:

splitting the plurality of PWM signals into a plurality of groups; and interleaving the plurality of PWM signals from the plurality of groups.

18. The method of claim 17, wherein:

the plurality of PWM signals comprises N PWM signals;

the plurality of groups comprises M groups; and

M is a factor of N.

19. The method of claim 18, wherein M is greater than one and less than N.

20. The method of claim 15, wherein the first sequence is a sequential sequence order based on physical locations of the plurality of phases.

* * * * *